United States Patent [19]

Gullett

[11] Patent Number: 5,021,229

[45] Date of Patent: Jun. 4, 1991

[54] REDUCTION OF CHLORINATED ORGANICS IN THE INCINERATION OF WASTES

[75] Inventor: Brian K. Gullett, Durham, N.C.

[73] Assignee: The United States of America as represented by the Environmental Protection Agency, Washington, D.C.

[21] Appl. No.: 287,495

[22] Filed: Dec. 21, 1988

[51] Int. Cl.$^5$ .............................................. B01J 8/08
[52] U.S. Cl. ................................. 423/245.3; 110/345
[58] Field of Search ................. 423/240, 245.1, 245.2, 423/659, 245.3; 110/343, 344, 345, 204

[56] References Cited

U.S. PATENT DOCUMENTS

| | | | |
|---|---|---|---|
| 3,888,193 | 6/1975 | Kishigami et al. | 110/8 R |
| 4,201,751 | 5/1980 | Holter et al. | 423/245.1 |
| 4,243,635 | 1/1981 | Aeberli | 422/176 |
| 4,303,477 | 12/1981 | Schmidt et al. | 201/2.5 |
| 4,502,396 | 3/1985 | Teller | 423/240 |
| 4,654,203 | 3/1987 | Maurer et al. | 423/245.3 |
| 4,681,045 | 7/1987 | Dvirka et al. | 110/345 |
| 4,753,181 | 6/1988 | Sosnowski | 110/346 |
| 4,789,532 | 12/1988 | Jons et al. | 423/240 |
| 4,793,270 | 12/1988 | Karasek et al. | 110/344 |
| 4,844,875 | 7/1989 | Ettenhadieh | 423/245.1 |

FOREIGN PATENT DOCUMENTS

| | | | |
|---|---|---|---|
| 3615027 | 11/1987 | Fed. Rep. of Germany | 423/245.3 |
| 0041565 | 4/1979 | Japan | 110/345 |
| 0045978 | 4/1979 | Japan | 110/345 |
| 0052873 | 4/1979 | Japan | 110/345 |

*Primary Examiner*—Olik Chaudhuri
*Assistant Examiner*—Ouimazd Ojan
*Attorney, Agent, or Firm*—Irving M. Freedman

[57] ABSTRACT

A method of diminishing the amount of chlorinated organics released to the atmosphere in the incineration of wastes which includes injecting calcium-based sorbents into the flue gas at around 700° C. to react with HCl to remove it from the flue gas to prevent it from forming the chlorinated organics.

15 Claims, 2 Drawing Sheets

REDUCTION OF CHLORINATED ORGANICS IN THE INCINERATION OF WASTES

BACKGROUND OF THE INVENTION

Considerable attention in recent years has been directed at the problem of the formation and emission into the atmosphere of highly toxic chlorinated organics by municipal and industrial waste incinerator plants. One of the major impediments to increased construction of such plants for the incineration of municipal and industrial waste has been the concern over the formation of such toxic chlorinated organics, namely polychlorinated dibenzodioxin (dioxins) and polychlorinated dibenzofuran (furans). It is desirable to prevent the formation of toxic chlorinated organics, which will eliminate 1) toxic air emissions, 2) disposal of toxic ashes, and 3) the need for wet or dry scrubbers, which are presently used to remove acid gases and chlorinated organics from flue gas emissions.

Control of combustion factors such as temperature, overfire/underfire air ratio, carbon monoxide (CO), oxygen, and waste feed moisture, all of which have been shown to be related to the formation of dioxins and furans, can minimize the formation of these chlorinated organics. However, complete elimination by this method appears impossible due to the complexities involved in monitoring and regulating the combustion of municipal and industrial waste. While it is generally agreed that control of combustion can minimize the emission of large amounts of toxic organics, complete or adequate control and destruction of dioxins and furans in waste incinerators cannot be ensured by these means alone. Indeed, there appears to be some dispute regarding the effectiveness of combustion controls, such as high furnace temperature, on the destruction of organics and the reduction of dioxins and furans.

Other methods of controlling toxic organics include sorting and removing chlorine-containing wastes, such as polyvinyl chloride (PVC) plastics, prior to waste combustion. Since chlorine-containing plastics account for only about 50% of the chlorine content of municipal solid waste (MSW), even complete removal and separate disposal (such as by burying in a landfill) of chlorine-containing materials will not sufficiently eliminate the problem. Indeed, this method appears to have only an erratic correlation with the reduction of toxic organics.

Spray drying by flue gas injection of sorbent slurry is another method of toxic organics reduction. Toxic organics and their precursors tend to condense and become absorbed on the dried sorbent particles. The sorbent and flue gas particles are then removed by a baghouse or an electrostatic precipitator, reducing the toxic organic gas emissions. However, the collected particles will contain organic (e.g. dioxin/furan) levels that may be of considerable concern to subsequent solid waste disposal. Further, the procedure may promote the formation of dioxin/furan. As the sorbent/ash particles are trapped on the surfaces of the particulate collection device, their residence time in the system increases. This increases the amount of time that the condensed dioxin/furan precursors remain at temperatures which may be optimal for such formation.

Other methods have been suggested to prevent or minimize the formation of toxic emissions, as contrasted with emission removal after formation. These include, for example, U.S. Pat. No. 4,681,045 - Dvirka et al. directed at injecting sodium carbonate ($Na_2CO_3$) or sodium bicarbonate ($NaHCO_3$) into the furnace to react with chlorides to form sodium chloride (NaCl) for reducing acid gas emissions such as hydrogen chloride (HCl) and sulfur dioxide ($SO_2$) thereby preventing downstream formation of PCDD/PCDF. However, this patent teaches against the use of calcium compounds such as calcium oxide (CaO) for such acid gas removal purposes. CaO is suggested in U.S. Pat. No. 2,800,172 for addition to petroleum fuel oil being burned to limit slag formation. However, these patents neither teach the process claimed herein nor achieve the desired objective of the present invention.

OBJECTS AND SUMMARY OF THE INVENTION

It is an object of the present invention to provide an improved method to reduce or prevent the formation of highly toxic dioxins and furans in waste incinerators by removing HCl, a reaction precursor.

It is a further object of the present invention to promote the proper disposal of wastes through incineration without creating health hazards or transferring pollutants between gas and solid media.

It is a still further object of the present invention to provide an improved method to reduce or prevent the formation of highly toxic dioxins and furans which can be readily applied to existing and new waste incinerators.

It is a still further object to provide a method for new incinerators that eliminates dioxins/furans without resorting to high operating temperatures for complete destruction of organics and subsequent high levels of nitrogen oxide ($NO_x$) formation.

In carrying out the above and other objects of the present invention, there is provided in a waste incinerator an improved method of reducing the emissions of chlorinated organics such as dioxins and furans produced by the combustion of waste material in which a calcium based sorbent material such as CaO or calcium hydroxide [$Ca(OH)_2$] is injected into the furnace flue gas in temperature regions around 700° C. for sufficient time that the sorbent will react with the HCl in the waste to form calcium chloride ($CaCl_2$) and diminish the amounts of chlorinated organics formed in the flue gases and subsequently released into the atmosphere.

DESCRIPTION OF THE DRAWINGS

The novel features which are believed to be characteristic of the present invention are set forth with particularity in the appended claims. The invention itself, both as to its organization and method of operation, together with further objects and advantages thereof, may be best understood by reference to the following description taken in conjunction with the accompanying drawings wherein:

Referring to FIG. 1, there is shown waste mixing pit 1 into which waste is dumped by suitable means such as overhead crane 3 moving along rails 4 and 5. Claw 6 of crane 3 is also moveable in a vertical direction through the control of the length of controllable or moveable cable 7. Crane 3 is used to load waste into mixing pit 2 and then to selectively load portions of waste 8 into chamber 9 where it is fed in a controlled manner through opening 11 onto stoker grate 10 which supports combustion or fire 12 in a manner well known in the art, including the control of air both above and below fire 12 in order to control the temperature of the combustion within the desired limits. The flow of air 13 is controlled by control valves 14, 15, and 16. Ashes 19 which result from combustion 12 fall through stoker grate 10 and are transported by conveyor belt 22 to ash pit 21 where they are removed for suitable disposal.

Figure 1:
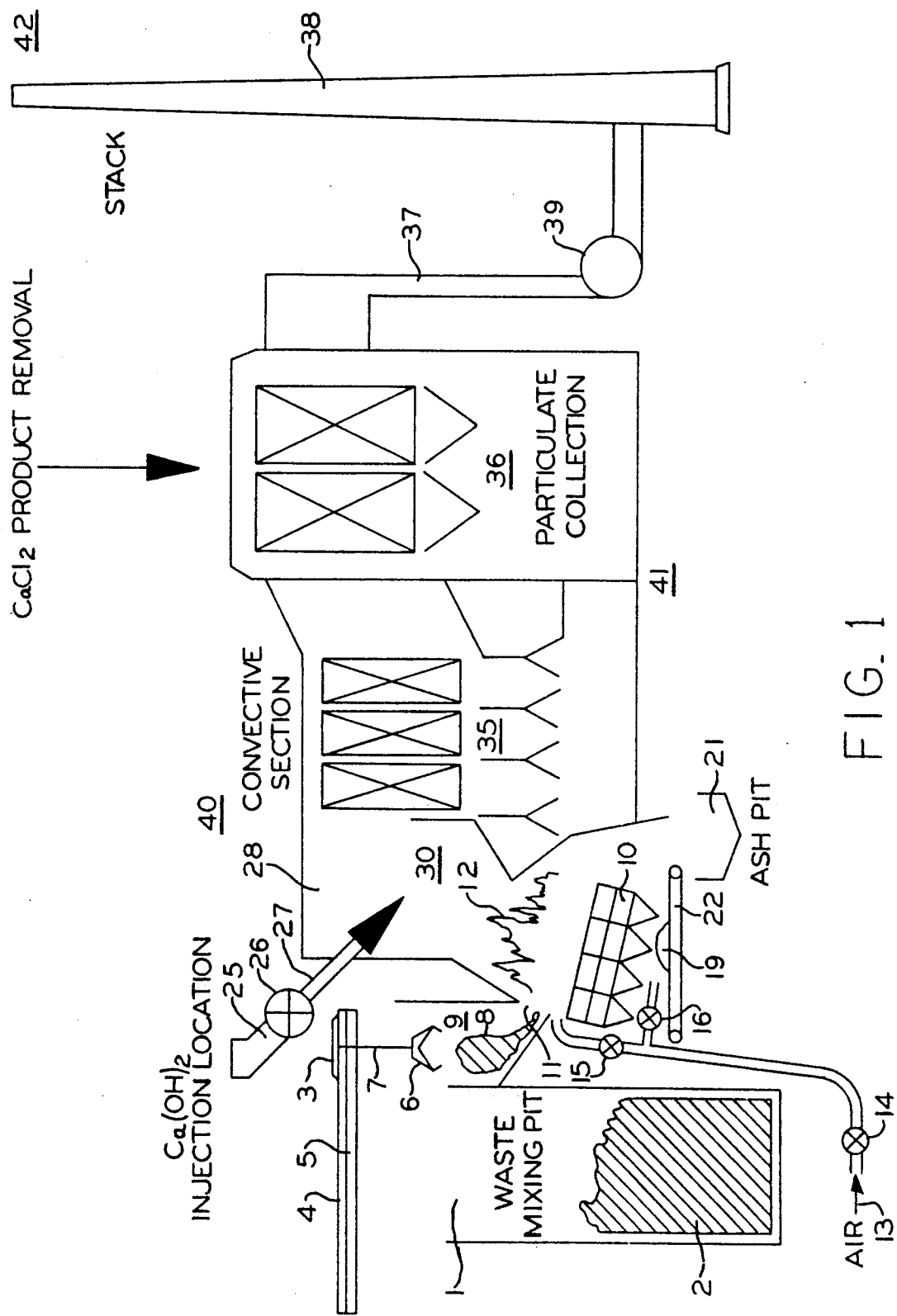
FIG. 1 is a diagram of a typical waste incineration system utilizing the present invention.

Calcium-based sorbent, CaO, or Ca(OH)$_2$, is dispensed from container 25 through dispensing control 26 and through nozzle 27 to be dry injected into furnace combustion chamber 30 above fire 12. The temperature of combustion chamber 30 in region where sorbent is injected is controlled by the furnace temperature control system including the control of air flow 13 through control valves 14, 15, and 16. An optimum temperature for the present invention is around 700° C. The CaO or Ca(OH)$_2$ reacts with HCl to form solid CaCl$_2$ particles which flow through convective section 35 of the furnace, shown generally as 40, to the particulate collection section or collector 36 where suitable collectors such as electrostatic precipitators or baghouses remove the particles from the gases prior to their release into the atmosphere through piping 37 and stack 38. The removal of HCl by formation of CaCl$_2$ particles will significantly decrease the amount of dioxins and furans which otherwise would be formed in the cooler end region or cooler portion (35, 36, and 37) shown generally as 41 of furnace 40. As a result, the release of dioxins and furans into atmosphere 42 outside the top of stack 38 is reduced, if not eliminated.

The CaCl$_2$ particles removed by collector 36, unlike the toxic dioxins and furans, are a harmless byproduct which can be disposed of conveniently with the ash.

The flue gas cools as it moves from the furnace combustion chamber through convective section 35 of furnace 40. While the chemical reaction of the sorbent and HCl decreases slightly as the flue gas cools, there is further removal of residual chlorinated organics through condensation and absorption on the sorbent surface at the lower gas temperatures. The velocity of the flue gas flow through the furnace can be controlled in the usual manner, such as with blower 39.

Figure 2:
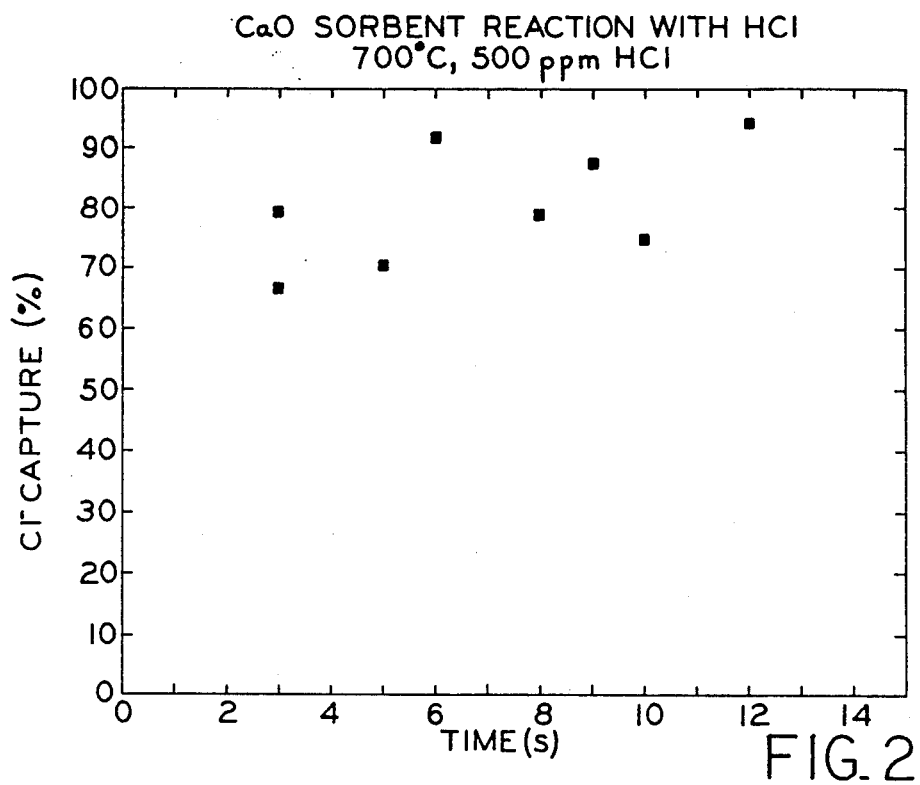
FIG. 2 is a plot showing the capture or removal of HCl with time for CaO sorbent in accordance with the present invention.
Figure 3:
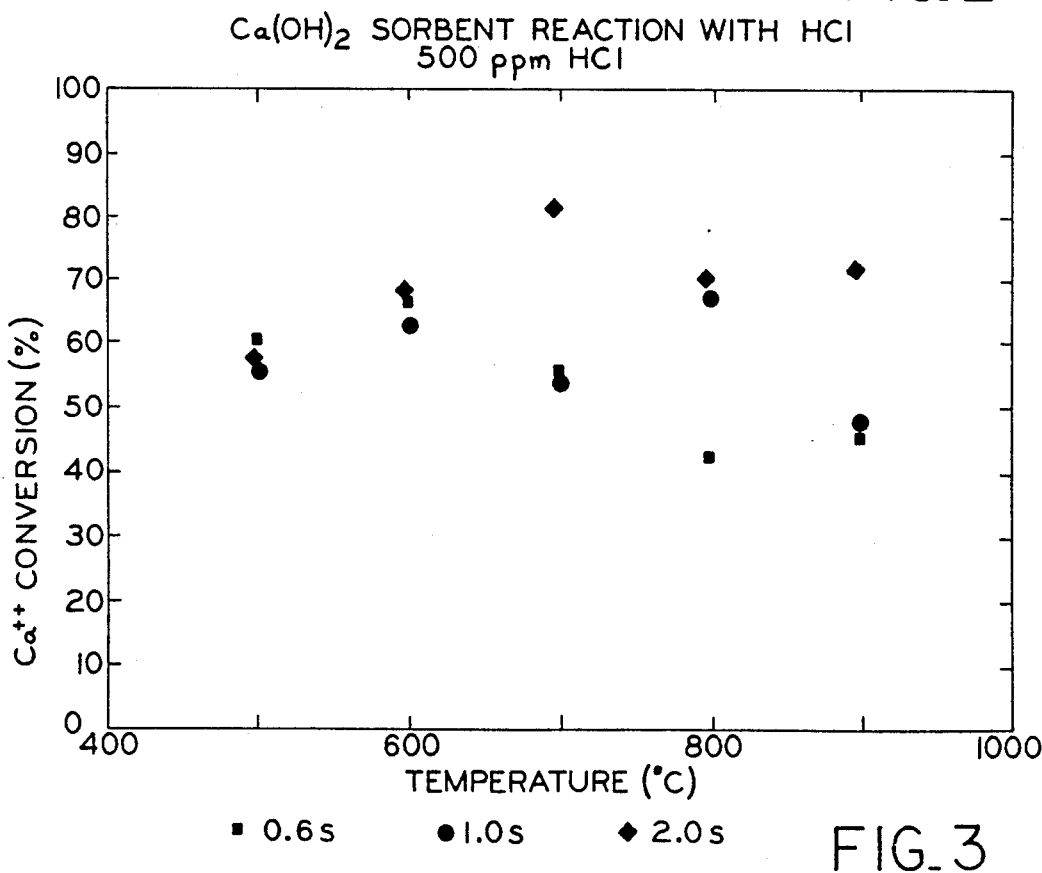
FIG. 3 is a plot showing the conversion of HCl with temperature for $Ca(OH)_2$ sorbent in accordance with the present invention.

FIG. 2 and FIG. 3 show laboratory scale test results comparing the chlorine (Cl$^-$) capture of CaO and Ca(OH)$_2$, respectively, in a number of tests. Tests were conducted in an isothermal, fixed bed reactor which was differential with respect to reactant HCl concentration. FIG. 2 illustrates the percent capture of Cl$^-$ on the Y axis with time in seconds on the X axis, it being recognized that both the amount of capture and the speed of capture are important in the operation of commercial incinerators. In the tests illustrated by FIG. 2, the temperature was controlled to 700° C. and there were 500 parts per million of HCl (a typical value for waste incinerators) introduced into the test chamber. It is to be noted that there was in excess of 60% capture of the HCl in 3 seconds and that the amount of capture was well in excess of 90% in 12 seconds. Cl$^-$ capture refers to the calculated removal of Cl$^-$ at an injected Ca/Cl ratio of 1/1, with the product formed being CaCl$_2$.

FIG. 3 shows testing at shorter times with Ca(OH)$_2$ in place of the CaO. As shown on the X axis, the temperature was varied from 500° to 900° C. These tests were conducted in an isothermal, entrained-flow reactor. The Y axis shows the percentage conversion of the Ca$^{++}$ to CaCl$_2$. The HCl was 500 parts per million and the sorbent and HCl reacted effectively over a wide range of temperatures (900 to 500° C.) with the optimum temperature being around 700° C., and with temperatures as low as 400° C. Conversion values are the molar percentage of Ca(OH)$_2$ that reacts to form CaCl$_2$ and as shown by FIG. 3 are very high. The Cl$^-$ capture values would be even higher since one Ca$^{++}$ atom combines with two Cl$^-$ atoms.

FIG. 3 shows that the HCl removal by Ca(OH)$_2$ injection is (1) very effective, and (2) effective over a wide temperature range. This is important since the temperature within municipal and industrial waste incinerators is difficult to control precisely. The broad temperature range of sorbent reactivity ensures that sorbent in a quench environment traverses a large range of reactive temperatures leading to long residence times and hence effective HCl removal.

It is thus apparent that calcium based sorbents such as CaO and Ca(OH)$_2$ are highly effective in HCl removal.

Other calcium based sorbents which could be used are calcium carbonate (CaCO$_3$), dolomitic sorbents (CaCO$_3$-$_{MgCo3}$), calcium-silicate sorbents, recycled sorbents (CaO-CaCl$_2$ or CaO-CaSO$_4$)

While the invention has been described in a specific embodiment, it will be understood that modifications may be made by those skilled in the art, including the application of the invention to different types of burner systems and wastes, and it is intended by the appended claims to cover all such modifications and changes as fall within the true spirit and scope of the invention.

I claim:

1. In a waste incinerator, including a combustion chamber nd a stack through which the flue gas produced by the combustion of waste material in the combustion chamber passes for emission into the atmosphere, an improved method of reducing the missions into the atmosphere of flue gases including chlorinated organics from the group consisting of chlorinated dioxins and furans produced by the combustion comprising the steps of:

injecting a calcium-based sorbent material selected from the group consisting of CaO, Ca(OH)$_2$, CaCO$_3$, CaCO$_3$-MgCO$_3$, CaO-CaCl$_2$, and calcium silicate into said flue gas in having a temperature the range of 400 to 900° C.;

heating said sorbent for a time sufficient for said sorbent to react with HCl in said flue gas and form CaCl$_2$ thereby to modify said flue gas by removing HCl from said flue gas;

passing said modified flue gas from said combustion chamber toward said stack with diminished HCl thereby diminishing the amount of said chlorinated organics which would otherwise have been formed;

removing residual chlorinated organics through condensation and absorption on the sorbent surface as said sorbent passes toward said stack in said modified flue gas; and releasing said flue gas into the atmosphere.

2. The method of claim 1 wherein the sorbent injecting is provided in the form of dry injection.

3. The method of claim 2 wherein the temperature of said flue gas is approximately 700° C.

4. The method of claim 1 wherein said sorbent is CaO.

5. The method of claim 1 wherein the particles of $CaCl_2$ are removed from the flue gas and collected prior to release of the flue gas to said atmosphere.

6. The method of claim 5 wherein said particle remover is an electrostatic precipitator.

7. The method of claim 1 wherein said temperature of said flue gas is approximately of 700° C.

8. The method of claim 1 wherein the particles of $CaCl_2$ are removed from the flue gas and collected by a collector selected for the group consisting of a baghouse and electrostatic precipitator prior to the release of said flue gas to said atmosphere.

9. The method of claim 1 wherein the sorbent material is maintained in contact with flue gas at said temperature for a period of approximately 10 seconds.

10. For addition to an existing waste incinerator including a combustion chamber and a stack through which the flue gas produced by the combustion of waste material in the combustion chamber passes for emission into the atmosphere for incinerating wastes such as municipal wastes of variable composition including chlorine containing wastes, an improved method of reducing the emissions into the atmosphere of flue gas including chlorinated organics from the group consisting of dioxins and furans produced as by-products of the incineration of waste material comprising the steps of:

adding a sorbent dispenser to said existing incinerator in the region of said flue gases to dispense a sorbent into said flue gas at a location where the temperature of sag flue gas is in the range of 500° to 900° C.;

injecting a calcium-based sorbent material selected form the group consisting of CaO, Ca(OH)$_2$, CaCO$_3$, CaCO$_3$-MgCO$_3$, CaO-CaCl$_2$, and calcium silicate into said flue gas of said waste incinerator from said dispenser which passes through said waste incinerator to the atmosphere;

heating said sorbent for a time sufficient for said sorbent to react with HCl in said flue gas and form CaCl2 thereby to modify said flue gas by removing significant amounts of HCl from said flue gas;

passing said modified flue gas to the portion of said furnace away from said combustion chamber and toward said atmosphere with diminished HCl thereby diminishing the amount of said chlorinated organics which would otherwise have been formed;

removing residual chlorinated organics through condensation and absorption of the sorbent surface as said sorbent passes toward said stack in said modified flue gas; and releasing said flue gas into he atmosphere.

11. The method of claim 10 wherein said temperature is approximately 700° C.

12. The method of claim 10 wherein said sorbent is injected into said flue gas in a dry state.

13. The method of claim 12 wherein a dispensing control for said sorbent is provided, and controlling the flow of said sorbent into said flue gas through said dispensing control.

14. The method of claim 10 wherein said sorbent injector is positioned in a location selected from locations within the combustion chamber and the convective section of said waste incinerator.

15. In a waste incinerator including a combustion chamber and a stack through which the flue gas produced by the combustion of waste material in the combustion chamber passes for emission into the atmosphere, an improved method of reducing the emissions into the atmosphere of flue gases including chlorinated organics from the group consisting of chlorinated dioxins and furans produced as by-products of the combustion of waste material such as municipal waste comprising the steps of:

injecting a calcium-based sorbent material from a sorbent dispenser into said flue gas of said waste incinerator, said sorbent material being selected from the group consisting of CaO, CaCO$_3$, Ca(OH)$_2$, CaCO$_3$-MgCO$_3$, CaO-CaCl$_2$, and calcium silicate into said flue gas having a temperature of approximately 700° C.;

said sorbent dispenser being placed in a location within sag waste incinerator which provides effective temperature and transit time for said sorbent within said waste incinerator;

heating said sorbent for a time in the order of up to 10 seconds sufficient for said sorbent to react with HCL and form CaCl$_2$ thereby to modify said flue gas by removing HCl from said flue gas;

passing said modified flue gas toward said stack with diminished HCl thereby diminishing the amount of said chlorinated organics which would otherwise have been formed;

removing residual chlorinated organics through condensation and absorption on the sorbent surface as said sorbent passes toward said stack in said modified flue gas;

removing said sorbent from said flue gas by a collector selected from the group consisting of a baghouse and an electrostatic precipitator; and releasing said flue gas into the atmosphere.

* * * * *